US012754007B2

(12) United States Patent
Ono et al.

(10) Patent No.: US 12,754,007 B2
(45) Date of Patent: Oct. 6, 2026

(54) STRAIN GAUGE MODULE INCLUDING STRAIN DETECTION DEVICE FILM AND THIN-PLATE METAL SUBSTRATE

(71) Applicant: MINEBEA MITSUMI Inc., Nagano (JP)

(72) Inventors: Tadashi Ono, Tokyo (JP); Makoto Kitazume, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 273 days.

(21) Appl. No.: 18/700,009

(22) PCT Filed: Oct. 26, 2022

(86) PCT No.: PCT/JP2022/039813

§ 371 (c)(1),
(2) Date: Apr. 10, 2024

(87) PCT Pub. No.: WO2023/074715

PCT Pub. Date: May 4, 2023

(65) Prior Publication Data

US 2024/0377179 A1 Nov. 14, 2024

(30) Foreign Application Priority Data

Oct. 29, 2021 (JP) ................................ 2021-178003

(51) Int. Cl.
*G01B 7/16* (2006.01)

(52) U.S. Cl.
CPC ..................................... *G01B 7/18* (2013.01)

(58) Field of Classification Search
CPC . G01L 9/0072; G01L 19/147; G01L 19/0645; G01L 19/0007; G01L 9/0042;
(Continued)

(56) References Cited

U.S. PATENT DOCUMENTS 11,131,590 B2 * 9/2021 Inamori .................... G01L 1/22
11,443,877 B2 * 9/2022 Kaneko .................. H01C 10/10
(Continued)

FOREIGN PATENT DOCUMENTS

JP S50-070943 U 6/1975
JP H03-074308 U 7/1991
(Continued)

OTHER PUBLICATIONS

Written Opinion of the International Searching Authority for PCT/JP2022/039813 mailed on Jan. 10, 2023.
(Continued)

*Primary Examiner* — Andre J Allen
(74) *Attorney, Agent, or Firm* — IPUSA, PLLC

(57) ABSTRACT

A present strain gauge module includes a film-like strain detection device that is to be attached to a measurement target and includes a terminal on an upper surface thereof, and is configured to detect strain generated in the measurement target; and a thin-plate metal substrate including an upper surface and a lower surface. The film-like strain detection device is attached to the upper surface of the thin-plate metal substrate via an adhesive. The lower surface of the thin-plate metal substrate serves as an attachment surface that is to be attached to the measurement target.

19 Claims, 5 Drawing Sheets

(58) Field of Classification Search

CPC ... G01L 19/0084; G01L 9/0073; G01L 3/102; G01L 3/105; G01L 17/00; G01L 13/025; G01L 9/0075; G01L 19/0038; G01L 9/0054; G01L 19/04; G01L 1/18; G01L 9/0055; G01L 3/104; G01L 7/00; G01L 19/0092; G01L 5/221; G01L 19/148; G01L 1/16; G01L 5/1627; G01L 19/14; G01L 15/00; G01L 7/04; G01L 1/205; G01L 7/18; G01L 1/125; G01L 19/143; G01L 1/20; G01L 1/2287; G01L 1/26; G01L 5/28; G01L 1/2206; G01L 9/12; G01L 5/24; G01L 3/101; G01L 9/0051; G01L 1/142; G01L 9/0052; G01L 9/065; G01L 1/2231; G01L 1/14; G01L 1/22; G01L 5/06; G01L 3/10; G01L 19/08; G01L 5/10; G01L 7/041; G01L 19/003; G01L 3/109; G01L 9/125; G01L 1/04; G01L 19/0618; G01L 5/162; G01L 19/0609; G01L 9/06; G01L 19/0627; G01L 23/10; G01L 19/0046; G01L 7/16; G01L 9/0022; G01L 19/0636; G01L 19/0023; G01L 1/2243; G01L 9/007; G01L 9/008; G01L 7/084; G01L 1/2218; G01L 1/2281; G01L 1/127; G01L 1/24; G01L 1/02; G01L 23/18; G01L 25/003; G01L 19/02; G01L 13/02; G01L 1/2293; G01L 9/0002; G01L 5/0019; G01L 1/146; G01L 5/228; G01L 5/00; G01L 5/288; G01L 19/142; G01L 5/0076; G01L 19/141; G01L 1/2262; G01L 3/108; G01L 11/02; G01L 27/007; G01L 7/043; G01L 3/103; G01L 3/12; G01L 5/0004; G01L 5/0038; G01L 1/225; G01L 19/12; G01L 5/103; G01L 5/108; G01L 5/165; G01L 27/005; G01L 5/12; G01L 1/005; G01L 9/006; G01L 19/0672; G01L 5/102; G01L 23/22; G01L 1/246; G01L 19/0069; G01L 25/00; G01L 9/0077; G01L 3/1457; G01L 11/00; G01L 5/0052; G01L 1/144; G01L 5/101; G01L 7/082; G01L 11/025; G01L 19/0681; G01L 5/226; G01L 5/0061; G01L 3/242; G01L 23/225; G01L 27/002; G01L 5/0042; G01L 5/107; G01L 9/0044; G01L 1/162; G01L 7/063; G01L 19/0015; G01L 5/0033; G01L 5/04; G01L 9/0001; G01L 5/167; G01L 19/086; G01L 19/083; G01L 1/2225; G01L 19/146; G01L 5/14; G01L 21/12; G01L 3/22; G01L 5/282; G01L 1/148; G01L 23/24; G01L 5/133; G01L 1/242; G01L 19/0654; G01L 3/24; G01L 9/16; G01L 3/20; G01L 5/223; G01L 5/0047; G01L 5/225; G01L 13/00; G01L 5/106; G01L 9/045; G01L 19/00; G01L 9/0026; G01L 9/0089; G01L 5/0085; G01L 9/0047; G01L 9/04; G01L 23/08; G01L 5/045; G01L 11/008; G01L 9/0025; G01L 1/00; G01L 9/08; G01L 9/14; G01L 13/026; G01L 23/222; G01L 5/13; G01L 9/0019; G01L 1/106; G01L 5/08; G01L 3/1435; G01L 5/0057; G01L 5/042; G01L 1/10; G01L 5/243; G01L 9/0041; G01L 9/0008; G01L 1/255; G01L 19/0061; G01L 9/10; G01L 1/044; G01L 1/2268; G01L 19/16; G01L 3/00; G01L 9/00; G01L 9/0076; G01L 7/08; G01L 1/241; G01L 17/005; G01L 9/0005; G01L 19/069; G01L 7/22; G01L 19/10; G01L 9/0079; G01L 1/2212; G01L 21/00; G01L 5/047; G01L 9/0035; G01L 5/136; G01L 5/246; G01L 9/0048; G01L 1/12; G01L 1/2237; G01L 11/006; G01L 19/06; G01L 5/16; G01L 9/0016; G01L 5/0009; G01L 5/22; G01L 11/04; G01L 11/004; G01L 27/00; G01L 7/166; G01L 9/0027; G01L 1/247; G01L 11/002; G01L 23/02; G01L 23/221; G01L 3/1471; G01L 3/245; G01L 7/104; G01L 9/0057; G01L 9/0091; G01L 3/1478; G01L 7/12; G01L 9/0098; G01L 1/165; G01L 3/1485; G01L 5/166; G01L 19/0663; G01L 23/16; G01L 3/02; G01L 3/04; G01L 5/164; G01L 13/023; G01L 9/02; G01L 3/1464; G01L 3/18; G01L 5/20; G01L 7/048; G01L 3/08; G01L 3/14; G01L 3/16; G01L 3/26; G01L 9/0086; G01L 19/145; G01L 23/125; G01L 9/0013; G01L 1/183; G01L 5/0028; G01L 7/182; G01L 9/0039; G01L 1/042; G01L 9/0045; G01L 9/0092; G01L 1/2256; G01L 9/0036; G01L 23/00; G01L 3/1428; G01L 5/009; G01L 1/06; G01L 9/0033; G01L 9/0061; G01L 9/0064; G01L 1/086; G01L 3/106; G01L 9/0007; G01L 9/002; G01L 13/06; G01L 9/0085; G01L 5/0023; G01L 7/022; G01L 9/0083; G01L 21/04; G01L 21/22; G01L 5/0071; G01L 7/088; G01L 7/163; G01L 9/0029; G01L 9/025; G01L 9/085; G01L 1/122; G01L 5/161; G01L 5/26; G01L 7/24; G01L 23/28; G01L 5/105; G01L 9/0004; G01L 1/2275; G01L 19/149; G01L 1/245; G01L 27/02; G01L 5/169; G01L 9/003; G01L 9/0058; G01L 1/25; G01L 21/14; G01L 1/243; G01L 23/26; G01L 7/02; G01L 9/0095; G01L 19/0076; G01L 5/008; G01L 13/028; G01L 23/085; G01L 3/1421; G01L 5/03; G01L 5/286; G01L 7/061; G01L 7/086; G01L 3/247; G01L 9/0082; G01L 1/103; G01L 11/06; G01L 21/10; G01L 3/1492; G01L 7/024; G01L 7/06; G01L 9/0032; G01L 9/0038; G01L 23/30; G01L 5/284; G01L 9/105; G01L 1/08; G01L 7/187; G01L 19/144; G01L 3/06; G01L 5/0066; G01L 7/14; G01L 3/045; G01L 5/18; G01L 7/20; G01L 13/021; G01L 23/32; G01L 23/12; G01L 23/145; G01L 3/107; G01L 3/1407; G01L 7/108; G01L 1/186; G01L 1/248; G01L 23/223; G01L 7/068; G01L 9/0097; G01L 1/046; G01L 7/102; G01L 9/0094; G01L 13/04; G01L 21/34; G01L 3/205; G01L 9/001; G01L 21/30; G01L 23/04; G01L 23/14; G01L 25/006; G01L 3/1414; G01L 5/168; G01L 7/045; G01L 9/005; G01L 9/0088; G01L 5/163; G01L 9/0014; G01L 9/0017; G01L 9/0023; G01L 9/18; G01L 1/083; G01L 21/32; G01L 3/1442; G01L 5/0014; G01L 1/048; G01L 23/06; G01L 7/065; G01B 7/16; G01B 7/18; G01B 5/30; G01B 7/34; G01B 11/16; G01B

11/18; G01B 5/28; G01B 7/24; G01B 7/30; G01B 7/22; G01B 7/28; G01B 7/14; G01B 5/20; G01B 21/30; G01B 17/00; G01B 7/003; G01B 7/06; G01B 7/345; G01B 7/20; G01B 11/24; G01B 17/02; G01B 21/20; G01B 3/008; G01B 21/32; G01B 7/287; G01B 21/08; G01B 11/165; G01B 5/0002; G01B 21/16; G01B 5/0004; G01B 21/22; G01B 7/02; G01B 11/22; G01B 11/303; G01B 13/22; G01B 17/04; G01B 11/14; G01B 13/00; G01B 5/285; G01B 21/045; G01B 7/001; G01B 11/02; G01B 5/207; G01B 11/306; G01B 21/047; G01B 5/008; G01B 5/14; G01B 7/26; G01B 11/00; G01B 3/22; G01B 7/00; G01B 7/087; G01B 21/042; G01B 5/06; G01B 7/107; G01B 5/12; G01B 5/255; G01B 7/012; G01B 7/12; G01B 7/13; G01B 7/31; G01B 1/00; G01B 11/161; G01B 13/12; G01B 21/24; G01B 7/125; G01B 11/08; G01B 11/245; G01B 5/0028; G01B 11/162; G01B 13/10; G01B 21/02; G01B 21/06; G01B 21/18; G01B 5/205; G01B 7/105; G01B 7/281; G01B 9/021; G01B 13/02; G01B 15/00; G01B 5/00; G01B 5/0025; G01B 5/066; G01B 5/08; G01B 5/18; G01B 7/023; G01B 11/0616; G01B 11/26; G01B 5/0014; G01B 5/003; G01B 7/10; G01B 11/0691; G01B 11/25; G01B 11/2755; G01B 11/30; G01B 13/08; G01B 13/16; G01B 11/043; G01B 11/272; G01B 17/08; G01B 5/02; G01B 5/043; G01B 5/068; G01B 7/282; G01B 7/283; G01B 11/06; G01B 11/20; G01B 2210/58; G01B 3/28; G01B 5/202; G01B 15/02; G01B 17/025; G01B 21/00; G01B 2210/66; G01B 5/012; G01B 5/146; G01B 5/201; G01B 5/25; G01B 11/105; G01B 11/275; G01B 17/06; G01B 5/24; G01B 11/026; G01B 11/2522; G01B 13/06; G01B 13/14; G01B 13/24; G01B 21/04; G01B 5/061; G01B 5/10; G01B 7/008; G01B 11/002; G01B 11/024; G01B 11/2441; G01B 11/27; G01B 15/06; G01B 3/30; G01B 7/004; G01B 11/005; G01B 11/0608; G01B 11/0625; G01B 11/164; G01B 3/02; G01B 3/14; G01B 3/48; G01B 5/0032; G01B 7/026; G01B 7/312; G01B 9/02045; G01B 11/12; G01B 2210/16; G01B 3/11; G01B 7/002; G01B 7/016; G01B 7/042; G01B 7/32

USPC ........................................................ 73/760–866

See application file for complete search history.

(56) References Cited

U.S. PATENT DOCUMENTS

| | | | | |
|---|---|---|---|---|
| 11,448,560 | B2 * | 9/2022 | Aizawa | G01L 1/2287 |
| 11,499,876 | B2 * | 11/2022 | Sato | G01B 7/20 |
| 11,543,309 | B2 * | 1/2023 | Misaizu | G01L 1/2287 |
| 11,692,806 | B2 * | 7/2023 | Misaizu | C22C 38/42<br>73/763 |
| 12,196,628 | B2 * | 1/2025 | Sato | H05K 1/189 |
| 2018/0217016 | A1 | 8/2018 | Inamori et al. | |
| 2020/0333199 | A1 * | 10/2020 | Asakawa | G01B 7/16 |

FOREIGN PATENT DOCUMENTS

| | | | | | |
|---|---|---|---|---|---|
| JP | 2004-301746 | | | 10/2004 | |
| JP | 2018-185346 | | | 11/2018 | |
| JP | 2019066454 | A | * | 4/2019 | G01L 1/2287 |
| JP | 2019113411 | A | * | 7/2019 | G01B 7/16 |
| WO | 2017/057459 | | | 4/2017 | |
| WO | WO-2019065841 | A1 | * | 4/2019 | G01B 7/16 |
| WO | WO-2023106236 | A1 | * | 6/2023 | G01B 7/16 |
| WO | WO-2025081120 | A1 | * | 4/2025 | G01L 1/2287 |

OTHER PUBLICATIONS

International Search Report for PCT/JP2022/039813 mailed on Jan. 10, 2023.

* cited by examiner

STRAIN GAUGE MODULE INCLUDING STRAIN DETECTION DEVICE FILM AND THIN-PLATE METAL SUBSTRATE

TECHNICAL FIELD

The present invention relates to strain gauge modules.

BACKGROUND ART

As film-like devices, for example, strain gauges including a resistor formed on a flexible base of a polyimide or the like are known (see, for example, Patent Literature 1). Such film-like devices are not readily attached to measurement targets because the base is flexible. In addition, a polyimide is a material that is poorly adhered, and thus special adhesion methods (heating and pressurizing) are required for attachment to the measurement target.

CITATION LIST

Patent Literature

Patent Literature 1: Japanese Patent Application Publication No. 2018-185346

SUMMARY OF THE INVENTION

Technical Problem

The present invention has been made in view of the above, and it is an object of the present invention to provide a strain gauge module that is readily attached to a measurement target.

Solution to Problem

A present strain gauge module (1) includes: a film-like strain detection device (30) that is to be attached to a measurement target and includes a terminal (34, 35) on an upper surface thereof, and is configured to detect strain generated in the measurement target; and a thin-plate metal substrate (10) including an upper surface (10*a*) and a lower surface (10*b*). The film-like strain detection device (30) is attached to the upper surface (10*a*) of the thin-plate metal substrate (10) via an adhesive (20). The lower surface (10*b*) of the thin-plate metal substrate (10) serves as an attachment surface that is to be attached to the measurement target.

The above reference numerals in the parentheses are given for ease of understanding, and are merely illustrative. The present invention is not limited to the embodiments as illustrated in the drawings.

Advantageous Effects of the Invention

According to the disclosed technique, it is possible to provide a strain gauge module that is readily attached to a measurement target.

DESCRIPTION OF THE EMBODIMENTS

Figure 1:
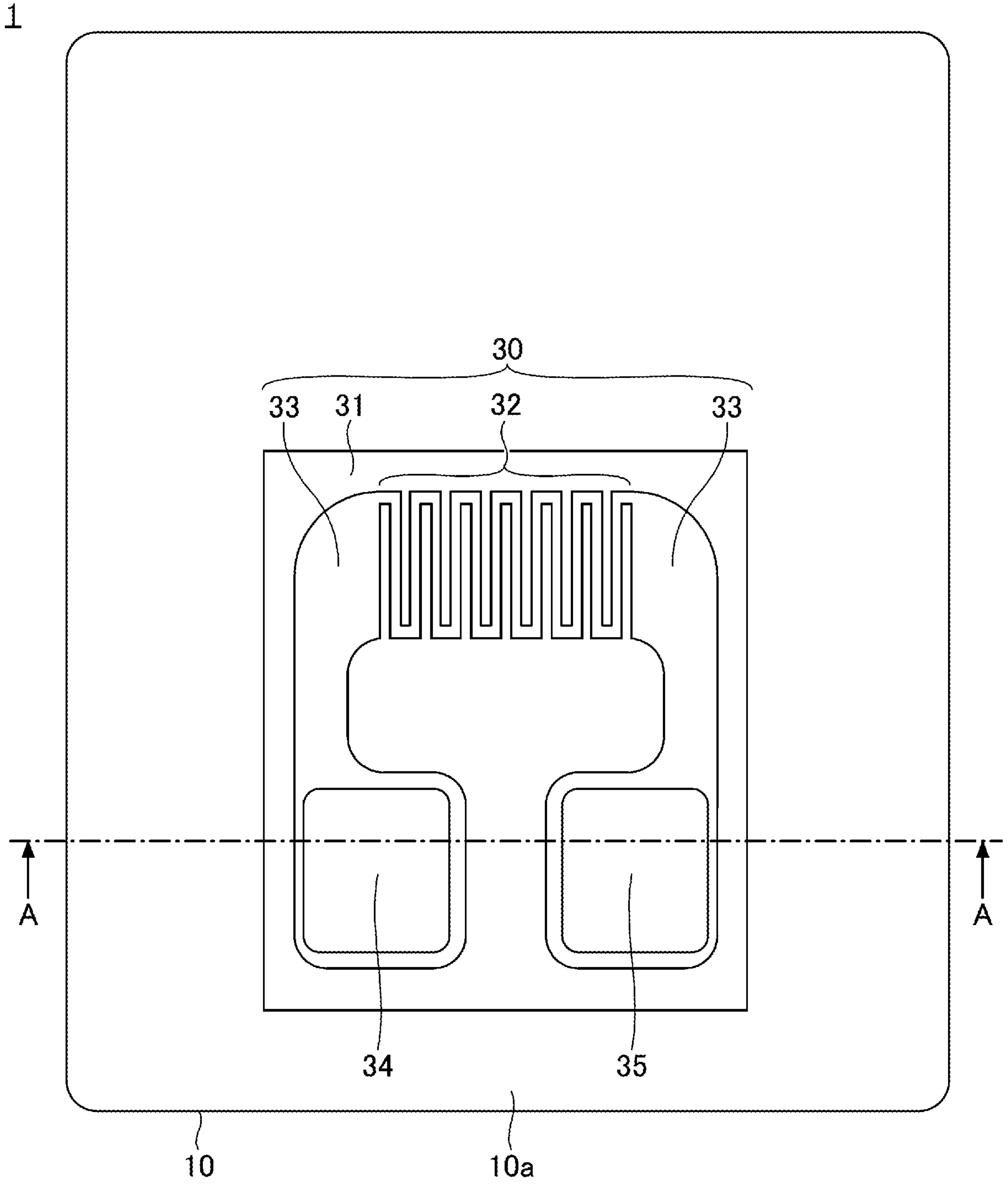
FIG. 1 is a plan view illustrating an example of a strain gauge module according to the present embodiment.

Hereinafter, the embodiments of the present invention will be described with reference to the drawings. In the drawings, the same components are denoted by the same symbols, and duplicate description thereof may be omitted.

Strain Gauge Module

Figure 2:
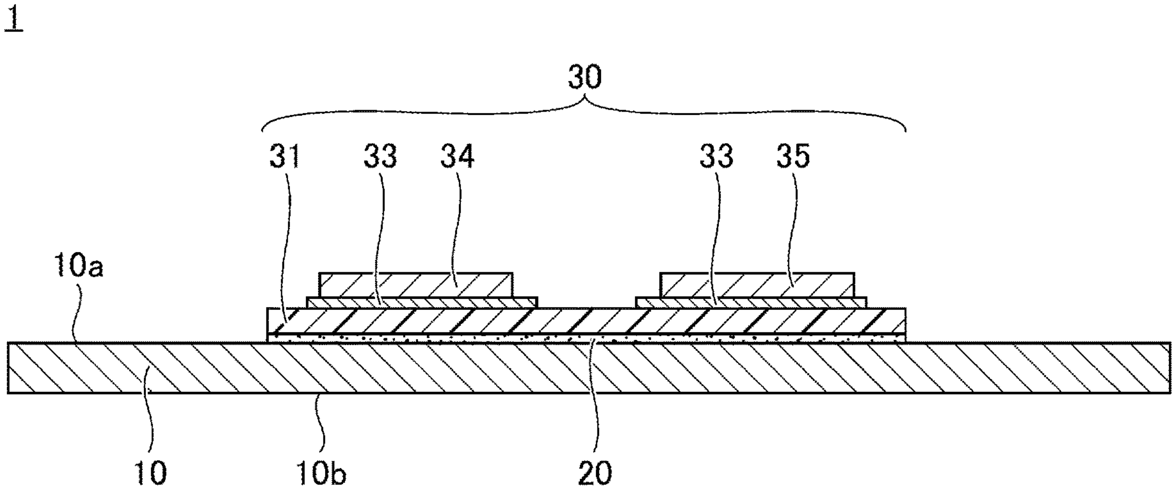
FIG. 2 is a cross-sectional view illustrating the example of the strain gauge module according to the present embodiment.
Figure 3:
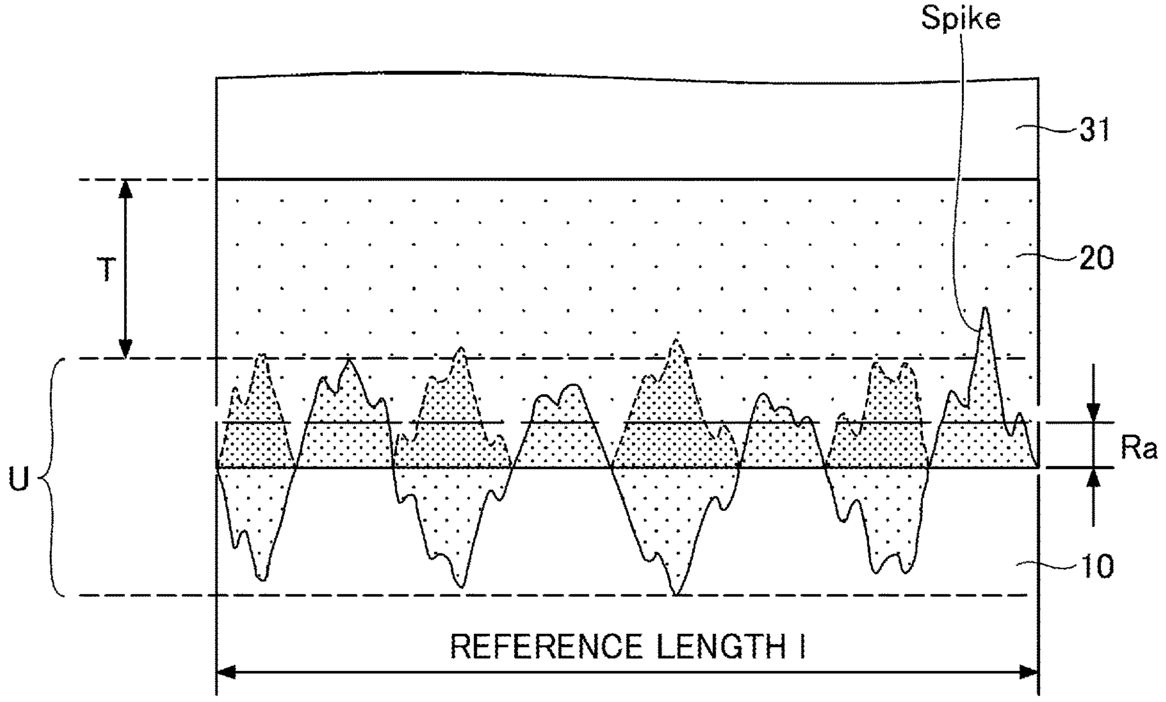
FIG. 3 is a diagram for describing a surface roughness Ra and a thickness of an adhesive.

FIG. 1 is a plan view illustrating an example of the strain gauge module according to the present embodiment. FIG. 2 is a cross-sectional view illustrating the example of the strain gauge module according to the present embodiment, and illustrates a cross section along line A-A in FIG. 1. FIG. 3 is a diagram for describing the surface roughness Ra and the thickness of the adhesive.

As illustrated in FIG. 1 and FIG. 2, the strain gauge module 1 includes a thin-plate metal substrate 10, an adhesive 20, and a film-like strain detection device 30.

The thin-plate metal substrate 10 is a member in which the film-like strain detection device 30 is disposed. Here, the thin-plate metal substrate refers to a metal substrate having a thickness of 200 μm or smaller. The thickness of the thin-plate metal substrate 10 is preferably 20 μm or larger and 120 μm or smaller. When the thickness of the thin-plate metal substrate 10 is set to be 20 μm or larger, strain can be stably detected. When the thickness of the thin-plate metal substrate 10 is set to be 120 μm or smaller, strain can be detected with high sensitivity.

The thickness of the thin-plate metal substrate 10 is more preferably 20 μm or larger and 80 μm or smaller, and further preferably 20 μm or larger and 50 μm or smaller. When the thickness of the thin-plate metal substrate 10 is set to be smaller, strain can be detected with higher sensitivity. Further, when the thickness of the thin-plate metal substrate 10 is set to be 20 μm or larger and 80 μm or smaller, the thin-plate metal substrate 10 can be readily fixed to even a curved measurement target. When the thickness of the thin-plate metal substrate 10 is set to be 20 μm or larger and 50 μm or smaller, the thin-plate metal substrate 10 can be further readily fixed to even a curved measurement target.

The thin-plate metal substrate 10 is preferably rectangular in a plan view in order to detect strain in a specific direction with high sensitivity. The direction in which strain is detected is, for example, a direction parallel to the longitudinal direction of the rectangular shape of the thin-plate metal substrate 10.

The surface roughness Ra of the upper surface 10*a* of the thin-plate metal substrate 10 is preferably 3 μm or higher and 20 μm or lower. When the surface roughness Ra of the upper surface 10*a* of the thin-plate metal substrate 10 is set to be 3 μm or higher and 20 μm or lower, it is possible to reduce an impact of the surface roughness Ra of the upper surface 10*a* of the thin-plate metal substrate 10 on the film-like strain detection device 30, and measure strain readily and accurately.

The surface roughness Ra of the upper surface 10*a* of the thin-plate metal substrate 10 is more preferably 3 μm or higher and 10 μm or lower, and further preferably 3 μm or higher and 5 μm or lower. When the surface roughness Ra of the upper surface 10*a* of the thin-plate metal substrate 10 is set to be smaller, it is possible to further reduce an impact of the surface roughness Ra of the upper surface 10*a* of the thin-plate metal substrate 10 on the film-like strain detection device 30, and measure strain further readily and further accurately.

Here, the surface roughness Ra is one of the numerical values indicating surface roughness, and is called an arithmetic average roughness. Specifically, as illustrated in FIG. 3, the surface roughness Ra is obtained by measuring absolute values of the height varying within a reference length l from the surface that is an average line, followed by arithmetically averaging.

As a material of the thin-plate metal substrate 10, SUS (stainless steel) having high hardness (readily propagating strain) is suitable for transmitting strain. However, this is by no means a limitation. The material of the thin-plate metal substrate 10 may be aluminum, a copper alloy, or the like. SUS is also suitable because of easy availability. No particular limitation is imposed on the size of the thin-plate metal substrate 10, which is, however, larger than the size of the film-like strain detection device 30 in a plan view.

The film-like strain detection device 30 is attached to the upper surface 10*a* of the thin-plate metal substrate 10 via the adhesive 20. As the adhesive 20, for example, an epoxy-based resin or the like may be used. A flexural modulus of the adhesive 20 may be, for example, 3 GPa or higher and 20 GPa or lower. The adhesive 20 may include a filler, if necessary. When the adhesive 20 includes a filler, the filler included may be an inorganic filler or may be an organic filler. When the adhesive 20 includes an inorganic filler, the filler diameter is preferably 5 μm or less. When the adhesive includes an organic filler, the filler diameter is preferably 10 μm or less.

A thickness T of the adhesive 20 is preferably 30 μm or smaller. When the thickness T of the adhesive 20 is 30 μm or smaller, strain of the thin-plate metal substrate 10 can be efficiently transmitted to the film-like strain detection device 30. As illustrated in FIG. 3, the thickness T of the adhesive 20 is a distance from the tip of the projecting portions denoted by a solid line, excluding the abnormal projection (spike), to the lower surface of a base 31 in the upper surface 10*a* of the thin-plate metal substrate 10. The projections and recesses denoted by a dashed line in FIG. 3 are virtual images. The gaps between the projections and the recesses in a portion U of FIG. 3, i.e., the gaps between the projections and the recesses of the upper surface 10*a* of the thin-plate metal substrate 10, are filled with the adhesive 20.

The film-like strain detection device 30 includes a base 31, a resistor 32, an interconnect 33, and terminals 34 and 35. No particular limitation is imposed on the size of the film-like strain detection device 30. However, from the viewpoint of downsizing the strain gauge module 1, the film-like strain detection device 30 is preferably compact. For example, the base 31 may be formed into a square or rectangular shape in which the length of one side is from about 1.5 mm through about 2 mm.

The base 31 is a member serving as a base layer on which the resistor 32 is to be formed, and has flexibility. No particular limitation is imposed on the thickness of the base 31, which may be appropriately selected in accordance with the intended purpose. The base 31 may be formed of an insulating resin film, such as a film of a PI (polyimide) resin or the like.

The resistor 32 is a thin film formed on the upper surface of the base 31, for example, in a zigzag pattern, and is a sensitive part that causes resistivity change in response to receiving strain. The resistor 32 may be formed directly on the upper surface of the base 31 or may be formed via other layers on the upper surface of the base 31. No particular limitation is imposed on the thickness of the resistor 32, which may be appropriately selected in accordance with the intended purpose. However, the thickness of the resistor 32 is, for example, 15 μm or larger and 50 μm or smaller.

The resistor 32 may be formed of, for example, a material including Cr (chromium), a material including Ni (nickel), or a material including both of Cr and Ni. That is, the resistor 32 may be formed of a material including Cr, Ni, or both. Examples of the material including Ni include Cu—Ni (copper nickel) and the like. Examples of the material including both of Cr and Ni include Ni—Cr (nickel chromium) and the like.

As the resistor 32, a Cr mixed phase film may be used. Here, the Cr mixed phase film is a film of mixed phases of Cr, CrN, $Cr_2N$, and the like. The Cr mixed phase film may include unavoidable impurities, such as chromium oxide and the like. When the Cr mixed phase film is used as the resistor 32, the film-like strain detection device 30 can be made highly sensitive and can be downsized.

The terminals 34 and 35 are formed on the upper surface near the ends of the interconnect 33. The terminals 34 and 35 are connected to both ends of the resistor 32 via the interconnect 33 formed of copper or the like, and are formed into, for example, a rectangular shape in a plan view. The terminals 34 and 35 are a pair of electrodes configured to output strain-derived change in the resistivity of the resistor 32. The terminals 34 and 35 are formed of, for example, copper or the like. A gold film or the like may be stacked on the surface of copper or the like.

The strain gauge module 1 may include a resin over the thin-plate metal substrate 10, the resin covering the film-like strain detection device 30. The resin may be formed, for example, to expose a part of or the entirety of the terminals 34 and 35 of the film-like strain detection device 30. When the resin covering the film-like strain detection device 30 is provided over the thin-plate metal substrate 10, it is possible to increase the mechanical strength of the terminals 34 and 35 of the film-like strain detection device 30 and the resistance of the film-like strain detection device 30 to environmental factors (humidity, gas).

As the resin covering the film-like strain detection device 30, in order to suppress the output (offset) of the film-like strain detection device 30 with no strain being applied, it is preferable to use a material including no filler or a material including an inorganic or organic filler of 3 μm or less. Alternatively, as the resin covering the film-like strain detection device 30, it is preferable to use a material having a hardness suitable for strain propagation, i.e., a hardness of from D90 through A15, and a tensile strength of from 0.3 MPa through 10 MPa. Examples of such a material include thermosetting or photocurable silicone-based resins and epoxy-based resins. When such a low-stress resin is used as the resin covering the film-like strain detection device 30, it is possible to reduce an impact of the covered resin on the characteristics (sensitivity) of the film-like strain detection device 30.

Because the lowermost layer of the strain gauge module 1 is the thin-plate metal substrate 10, the lower surface 10*b* of the thin-plate metal substrate 10 serving as an attachment surface can be readily fixed to the measurement target with an adhesive or a tacky agent in the form of liquid or film (tape). The thickness of the adhesive or tacky agent may be, for example, about 25 μm.

That is, the lowermost layer of the strain gauge module 1 is not formed of a flexible resin (e.g., a polyimide) unlike in the existing strain gauge, and thus the strain gauge module 1 is readily attached to the measurement target. In addition, a polyimide is a material that is poorly adhered, and thus special adhesion methods (heating and pressurizing) are required for attachment to the measurement target. However, such a special adhesion method is unnecessary for attaching the thin-plate metal substrate 10 to the measurement target.

Percentage of Resistivity Change of Resistor 32

The film-like strain detection device 30 that does not include the thin-plate metal substrate 10 and the adhesive 20 (hereinafter referred to as the film-like strain detection device 30 alone) was studied for change in the resistivity of the resistor 32 when the film-like strain detection device 30 alone was attached to surfaces with different surface roughness.

Figure 4:
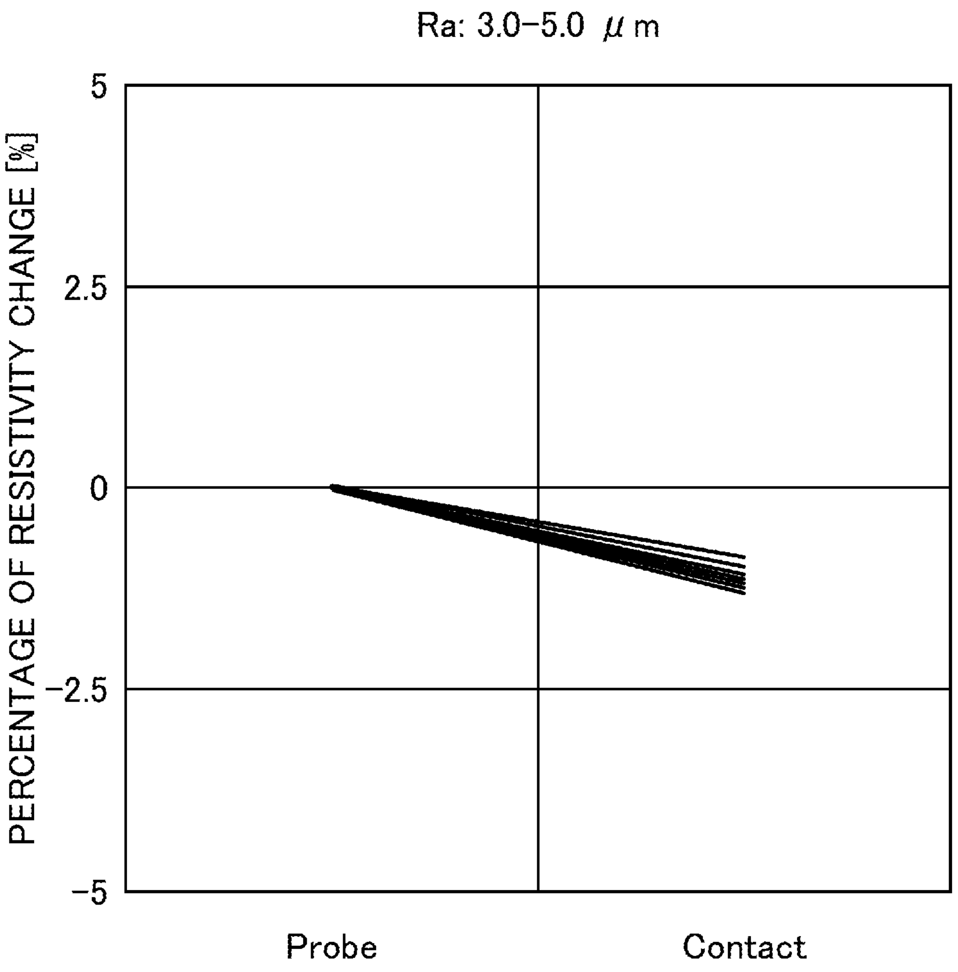
FIG. 4 is a graph indicating a percentage of resistivity change of a film-like strain detection device alone (part 1).

FIG. 4 is a graph indicating the percentage of resistivity change of the film-like strain detection device alone (part 1) and indicates the percentage of resistivity change when the film-like strain detection device 30 alone was attached to a surface having a surface roughness Ra of from 3.0 μm through 5.0 μm. There is no spike on the surface to which the film-like strain detection device 30 alone is attached.

In FIG. 4, Probe is a resistivity obtained through measurement performed by a measuring instrument connected to the terminals 34 and 35 of the film-like strain detection device 30 alone. Also, Contact is a resistivity obtained through measurement performed by a measuring instrument connected to the terminals 34 and 35 of the film-like strain detection device 30 alone after the film-like strain detection device 30 alone was attached to a surface having a surface roughness Ra of from 3.0 μm through 4.0 μm. In FIG. 4, the resistivity of Contact is shown as the percentage of resistivity change with the resistivity of Probe being treated as an initial value. As shown in FIG. 4, the percentage of resistivity change when the film-like strain detection device 30 alone was attached to the surface having the surface roughness Ra of from 3.0 μm through 5.0 μm is 2% or lower, and the variation therein is very small.

Figure 5:
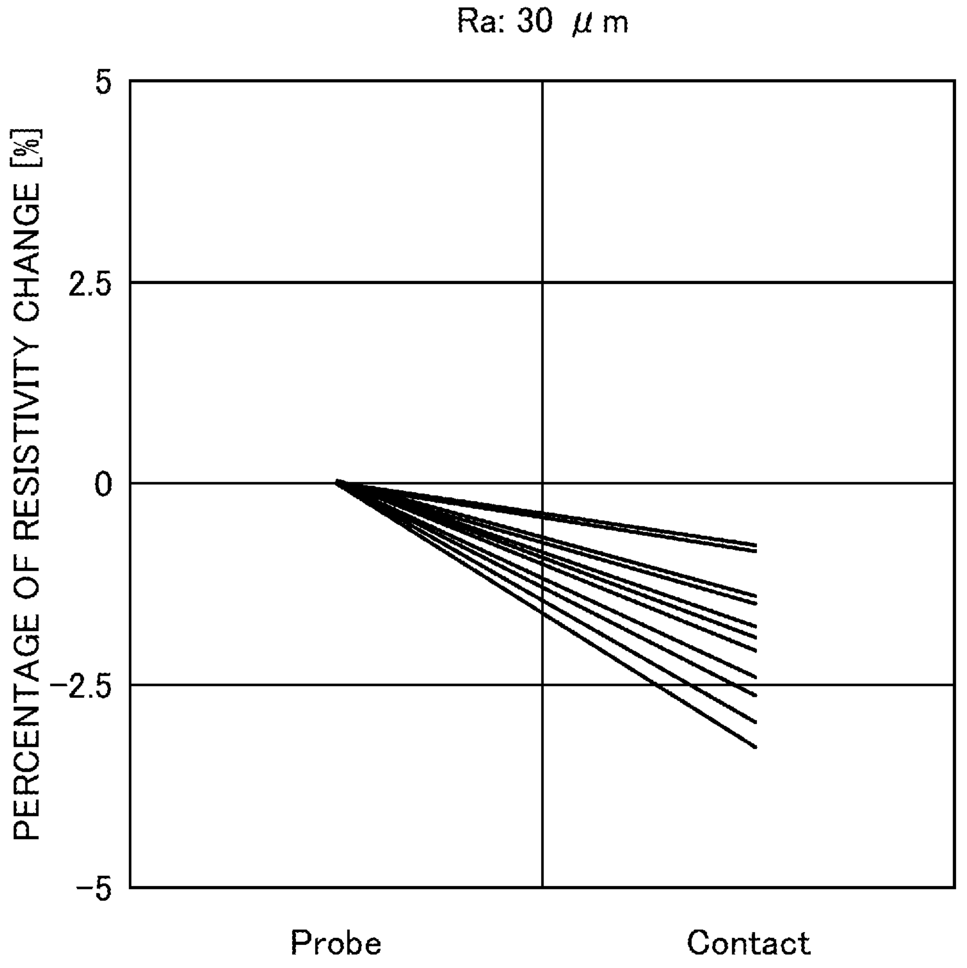
FIG. 5 is a graph indicating the percentage of resistivity change of the film-like strain detection device alone (part 2).

FIG. 5 is a graph indicating the percentage of resistivity change of the film-like strain detection device alone (part 2) and indicates the percentage of resistivity change when the film-like strain detection device 30 alone was attached to a surface having a surface roughness Ra of 30 μm. There is no spike on the surface to which the film-like strain detection device 30 alone is attached. As shown in FIG. 5, the percentage of resistivity change when the film-like strain detection device 30 alone was attached to the surface having the surface roughness Ra of 30 μm is from about 1% through about 3%, and the variation therein is larger than in FIG. 4.

Figure 6:
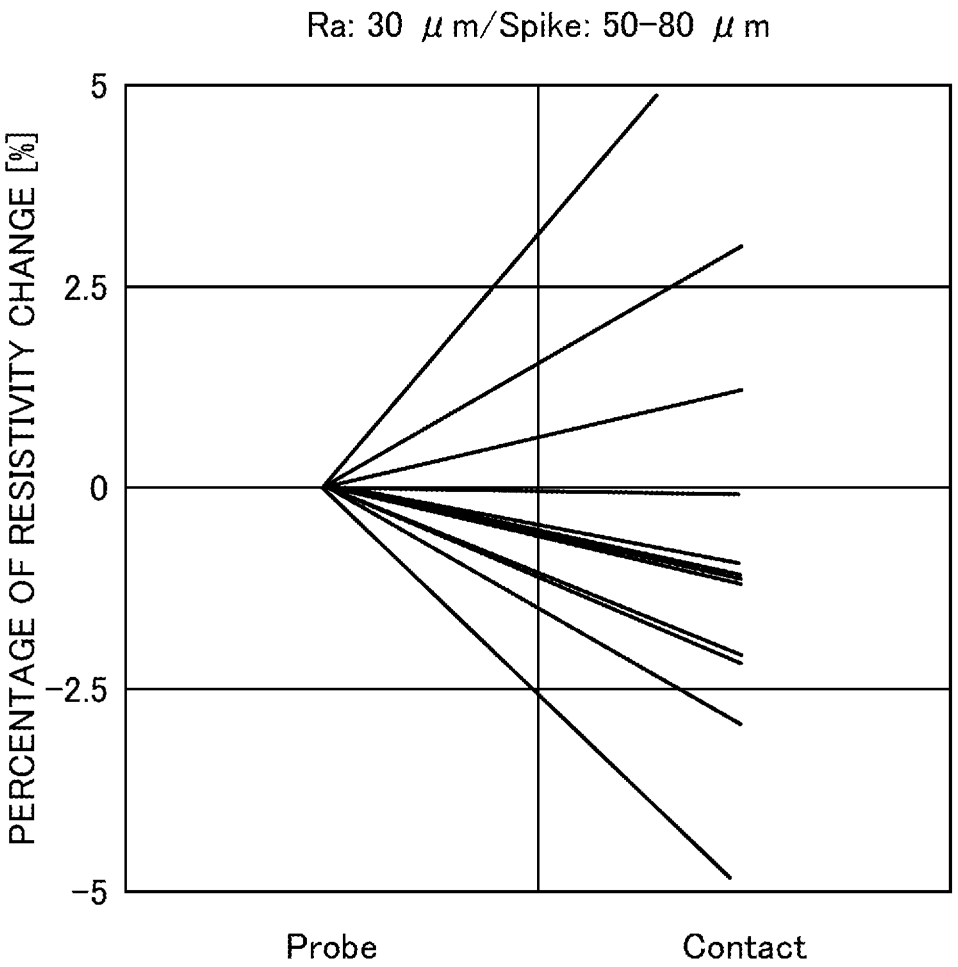
FIG. 6 is a graph indicating the percentage of resistivity change of the film-like strain detection device alone (part 3).

FIG. 6 is a graph indicating the percentage of resistivity change of the film-like strain detection device alone (part 3) and indicates the percentage of resistivity change when the film-like strain detection device 30 alone was attached to a surface having a surface roughness Ra of 30 μm and including spikes of from 50 μm through 80 μm. As shown in FIG. 6, the absolute value and the variation of the percentage of resistivity change when there are spikes are greatly increased compared to when there is no spike as shown in FIG. 5.

In this way, when the film-like strain detection device 30 is directly attached to the measurement target, because the base 31 is a flexible resin, the characteristic variation due to the surface roughness Ra of the measurement target occurs, and the strain cannot be accurately measured. As in the case of FIG. 4, if the film-like strain detection device 30 is attached to the measurement target having a low surface roughness Ra, the strain can be accurately measured. In practice, however, the film-like strain detection device 30 is attached to various measurement targets, and thus it is challenging to always accurately measure the strain of different measurement targets.

Meanwhile, the film-like strain detection device 30 of the strain gauge module 1 is attached via the adhesive 20 to the thin-plate metal substrate 10 in which the upper surface 10*a* has a desired surface roughness Ra. With this structure, the impact of the surface roughness of the measurement target is eliminated, and strain can be measured readily and accurately. In addition, because spikes of the upper surface 10*a* of the thin-plate metal substrate 10 can be managed, measurement with little variation is possible. Especially, the strain can be more accurately measured by setting the surface roughness Ra of the upper surface 10*a* of the thin-plate metal substrate 10 to be 3 μm or higher and 20 μm or lower.

Although the preferred embodiments have been described above in detail, the present invention is not limited to the above-described embodiments, and various modifications and substitutions can be made to the above-described embodiments without departing from the scope of claims recited.

The present international application claims priority under Japanese Patent Application No. 2021-178003 filed on Oct. 29, 2021, and the entire contents of Japanese Patent Application No. 2021-178003 are incorporated in the present international application by reference.

REFERENCE SIGNS LIST

1 strain gauge module, 10 thin-plate metal substrate, 10*a* upper surface, 10*b* lower surface, 20 adhesive, 30 film-like strain detection device, 31 base, 32 resistor, 33 interconnect, 34, 35 terminal

The invention claimed is:

1. A strain gauge module, comprising:

a strain detection device film configured to be attached to a measurement target, the strain detection device film including a terminal disposed on an upper surface thereof, and being configured to detect strain generated in the measurement target; and a thin-plate metal substrate including an upper surface and a lower surface, wherein the strain detection device film is attached to the upper surface of the thin-plate metal substrate via an adhesive layer, the lower surface of the thin-plate metal substrate serves as an attachment surface to be attached to the measurement target, and a thickness of the adhesive layer is 30 μm or smaller, the thickness of the adhesive layer being a distance from a tip of a projecting portion formed on the upper surface of the thin-plate metal substrate to a lower surface of the strain detection device film, the tip having a predetermined reference height in which an abnormal projection that exceeds the predetermined reference height is excluded.

2. The strain gauge module according to claim 1, wherein a thickness of the thin-plate metal substrate is 20 μm or larger and 120 μm or smaller.

3. The strain gauge module according to claim 1, wherein a surface roughness Ra of the upper surface of the thin-plate metal substrate is 3 μm or higher and 20 μm or lower.

4. The strain gauge module according to claim 1, wherein a material of the thin-plate metal substrate is stainless steel.

5. The strain gauge module according to claim 1, wherein the thin-plate metal substrate is rectangular in a plan view.

6. The strain gauge module according to claim 1, wherein the strain detection device film includes
a base formed of a polyimide, and
a resistor formed on the base.

7. The strain gauge module according to claim 2, wherein a surface roughness Ra of the upper surface of the thin-plate metal substrate is 3 μm or higher and 20 μm or lower.

8. The strain gauge module according to claim 2, wherein a material of the thin-plate metal substrate is stainless steel.

9. The strain gauge module according to claim 3, wherein a material of the thin-plate metal substrate is stainless steel.

10. The strain gauge module according to claim 2, wherein
the thin-plate metal substrate is rectangular in a plan view.

11. The strain gauge module according to claim 3, wherein
the thin-plate metal substrate is rectangular in a plan view.

12. The strain gauge module according to claim 4, wherein
the thin-plate metal substrate is rectangular in a plan view.

13. The strain gauge module according to claim 2, wherein
the strain detection device film includes
a base formed of a polyimide, and
a resistor formed on the base.

14. The strain gauge module according to claim 3, wherein
the strain detection device film includes
a base formed of a polyimide, and
a resistor formed on the base.

15. The strain gauge module according to claim 4, wherein
the strain detection device film includes
a base formed of a polyimide, and
a resistor formed on the base.

16. The strain gauge module according to claim 5, wherein
the strain detection device film includes
a base formed of a polyimide, and
a resistor formed on the base.

17. The strain gauge module according to claim 1, wherein
the adhesive layer includes a filler having a predetermined diameter, and
a recess of the upper surface of the thin-plate metal substrate is filled with the adhesive layer.

18. The strain gauge module according to claim 17, wherein
the filler includes an inorganic filler, and
a diameter of the inorganic filler is 5 μm or smaller.

19. The strain gauge module according to claim 17, wherein
the filler includes an organic filler, and
a diameter of the organic filler is 10 μm or smaller.

* * * * *